P. G. B. WESTMACOTT.
Device for Cleaning Grain.
No. 66,759.
4 Sheets—Sheet 1.
Patented July 16, 1867.
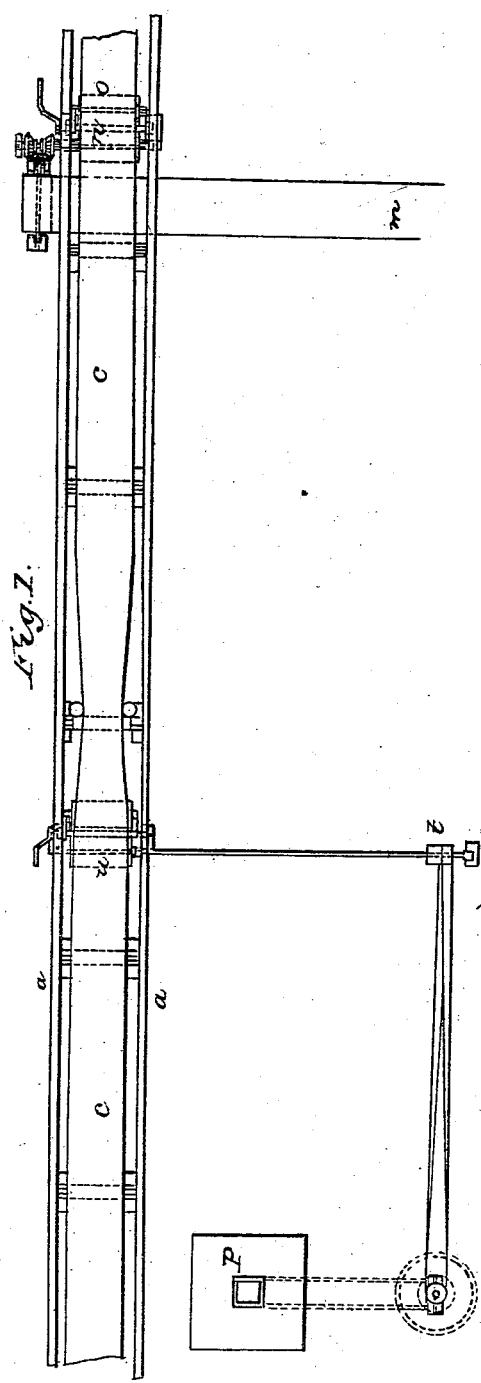
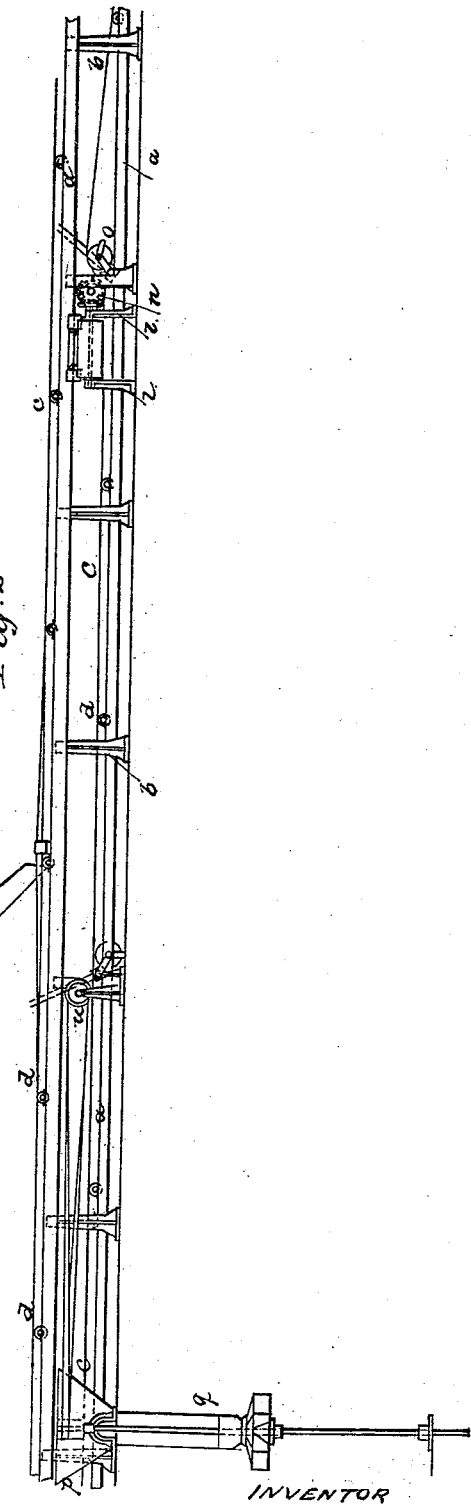
INVENTOR P. G. B. WESTMACOTT.
Device for Cleaning Grain.
No. 66,759.
4 Sheets—Sheet 2.
Patented July 16, 1867.
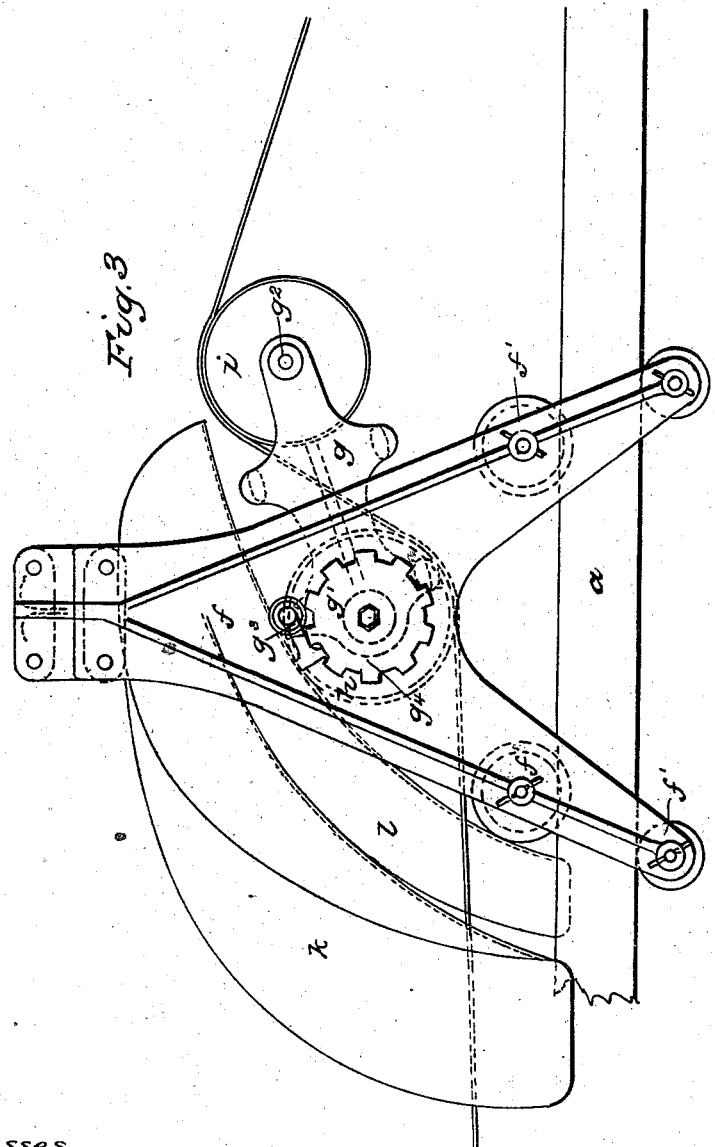

P. G. B. WESTMACOTT.
Device for Cleaning Grain.
No. 66,759.
4 Sheets—Sheet 3.
Patented July 16, 1867.
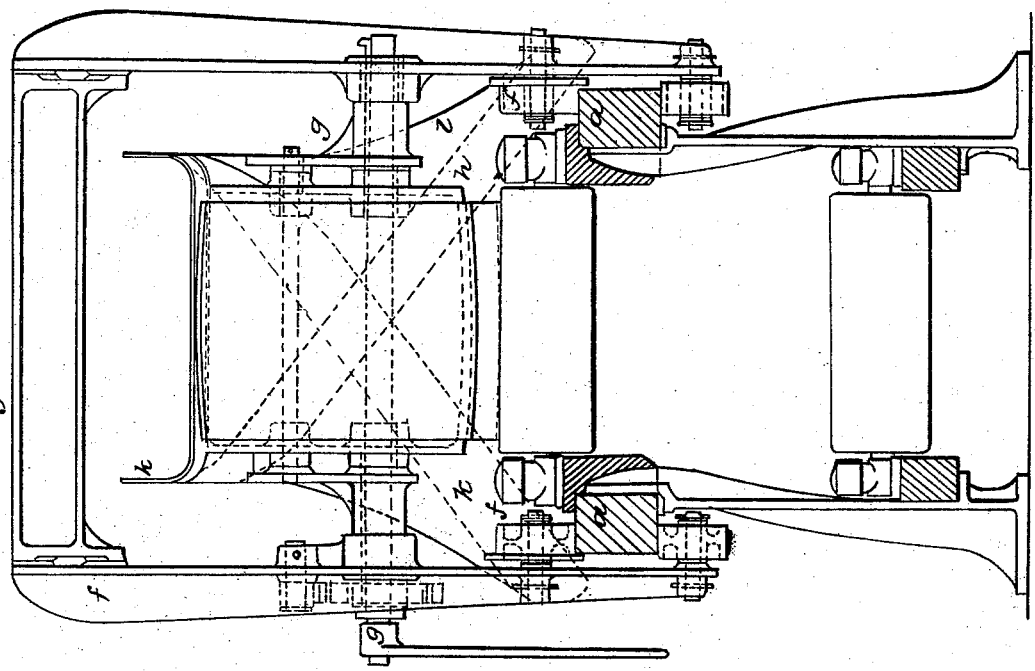

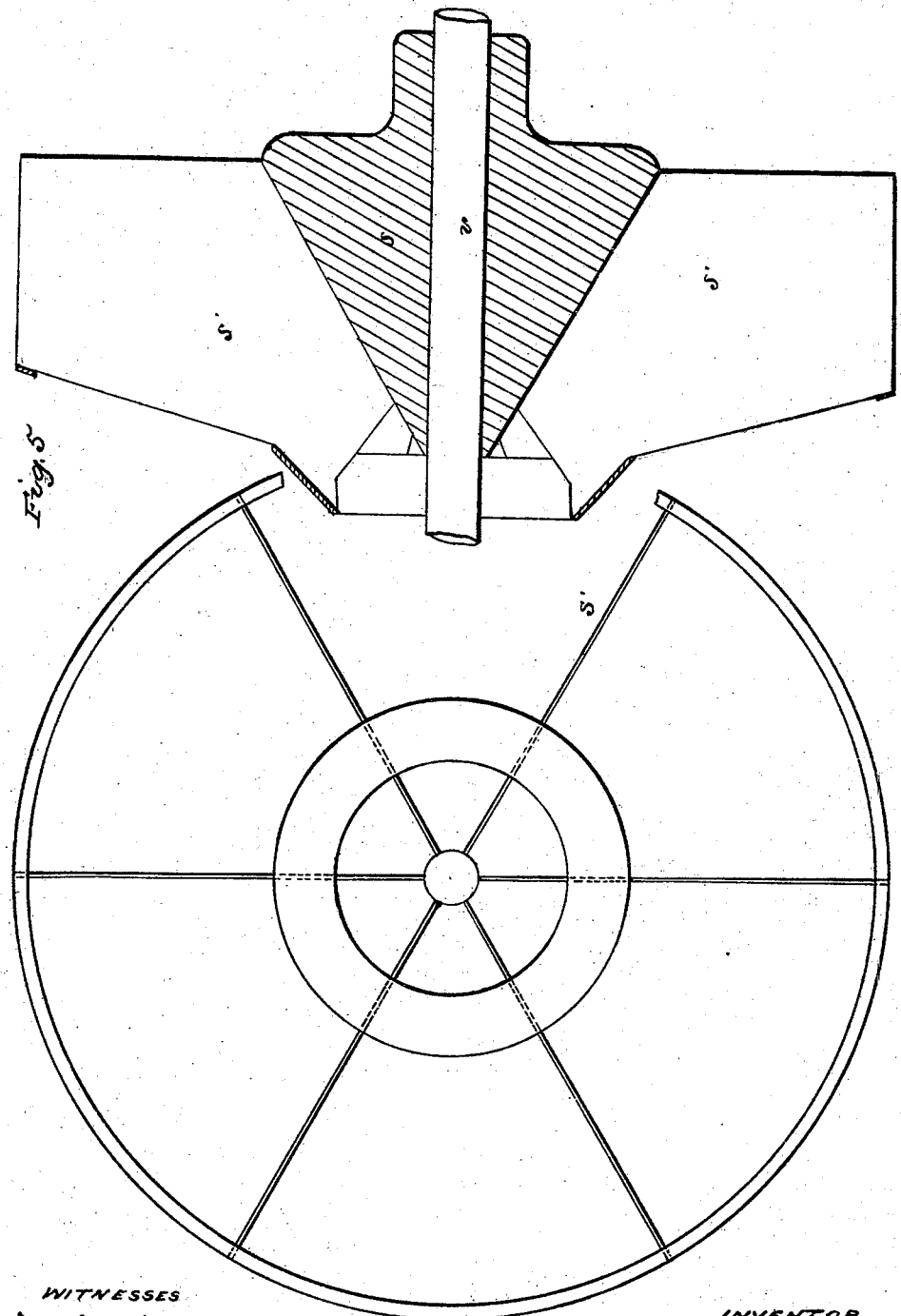

United States Patent Office.

PERCY GRAHAM BUCHANAN WESTMACOTT, OF ELSWICK, NEWCASTLE-UPON-TYNE, ENGLAND.

Letters Patent No. 66,759, dated July 16, 1867; patented in England November 21, 1866.

---

IMPROVEMENT IN DEVICE FOR CLEANING GRAIN.

---

The Schedule referred to in these Letters Patent and making part of the same.

---

TO ALL TO WHOM IT MAY CONCERN:

Be it known that I, PERCY GRAHAM BUCHANAN WESTMACOTT, of Elswick, Newcastle-upon-Tyne, England, a subject of the Queen of Great Britain, have invented or discovered new and useful "Improvements in Machinery for Conveying, Distributing, Cleaning, and Conditioning Corn and Grain, also applicable for other articles in bulk;" and I, the said PERCY GRAHAM BUCHANAN WESTMACOTT, do hereby declare the nature of the said invention, and in what manner the same is to be performed, to be particularly described and ascertained in and by the following statement thereof, that is to say:

In order to convey corn or other article in bulk from one part of a warehouse to another, or otherwise from place to place, I employ endless bands running at a considerable speed, say from eight feet per second upwards. The corn or other article is delivered on to the band down a hopper or chute immediately above the surface of the band, and so curved or formed that the velocity at which the corn or material is delivered is equal, as nearly as may be, to the speed of the band; thus the corn or material is caused quietly and at once to take its place on the band, which then rapidly carries it away. At the point where the band receives the corn or material it is bent up on each side by guide-pulleys into a trough-like form, the better to insure the corn or material remaining on the band. The band is supported at intervals on rollers on a frame running from end to end of the floor or place along which the corn or material is required to be conveyed; and this frame also supports guides or rails, on which an apparatus for throwing off the corn or material from the band traverses, so that by means of this apparatus the corn or material may be deposited at any point in the length of the band where it may be required. The discharging apparatus consists of a carriage with a pair of rollers upon it; these rollers are at a short distance apart, and are carried by a rocking-frame. When the discharging apparatus is out of use the band with the corn or material upon it runs freely between the rollers; but when it is required to discharge the band opposite the point where the apparatus is standing, the rocking-frame is so inclined that the rollers deflect the band out of the straight line, raising the part of the band which is approaching the apparatus, and depressing or holding down the part which is passing away from it. This sudden change in the direction in which the band is travelling causes the corn or material to leave it by its momentum, and it flies forward into a chute which conducts it away on one side and discharges it either on to the floor or down a fixed chute, or it may be on to another travelling band at an angle to the first and similar to it. This operation of removing the corn or other similar material from the band also cleanses it, as the lighter particles have not sufficient momentum to overcome the resistance the air opposes to their flight, and consequently fall short of the hopper or chute, and are collected separately in a suitable receptacle. When it is desired to spread the corn or material over a floor or space, I cause it to be delivered by apparatus such as above described, or otherwise, to a distributing apparatus, which consists of a cone mounted on a vertical axis, and on the surface of this cone are radial blades. The corn or material is caused to descend on to the cone through a vertical pipe, the lower end of which is above the top of the cone, and as the cone revolves rapidly its arms strike the descending corn or material and throws it off, the cone being some distance above the floor on which the distribution is required. It will be observed that in the course of this distributing operation the corn or material is thoroughly exposed to the air, and in this way it is "conditioned," that is to say, deleterious changes are checked, with which object corn is now commonly shovelled over and thrown into the air by hand labor.

In order to drive the distributing and conditioning apparatus, and also any secondary conveying bands which may be required, I take the power where convenient from the main conveying band on its return or under side. I employ for this purpose two rollers or drums, one on each side of the return band. One of the rollers or drums also is movable, and can be set so as to deflect the band against the other, which is then caused to rotate with the band, and it is geared by means of bevelled gear, with the axis of another drum, round which the secondary carrying band passes, or it is geared with the axis of a pulley, which by a strap drives the distributing and conditioning apparatus.

And in order that my said invention may be most fully understood and readily carried into effect, I will proceed to describe the drawings hereunto annexed.

Description of the Drawings

Figure 1 is a plan, and Figure 2 is a side view of the apparatus. *a a* are guide-rails, supported on standards *b b*, fixed to the floor of the warehouse. These guide-rails may be run from end to end of the floor. *c* is an endless band of strong woven fabric placed between the rails *a*, and supported at convenient distances by small rollers, *d*, which these rails carry. At one end of the rails *a* the band passes around a drum driven by steam or other power at a surface speed of about eight feet per second, or upwards. At the other end of the rails *a* it passes around another similar drum, which is not driven but is carried by a carriage which is able to move along on the rails $a$, and a cold and weight attached to this carriage tend constantly to draw it back, and so the band $c$ is kept strained. The weight applied must be sufficient to prevent the driving-drum at the other end slipping. $e$ is a hopper and chute for delivering the grain or material on to the endless band $c$. Its lower end or lip is just above the surface of the band, and is curved so as to deliver the grain or material in a direction nearly parallel with the surface of the band. The length of the chute should be such that the grain or material in running down it, may acquire a velocity about equal to that at which the band $c$ travels. At the point where the grain or material lands on the band, the edges of the band are turned up on each side by pulleys, set at an angle, and mounted temporarily on the rails $a$, or otherwise suitably supported. The hopper may either be mounted at one end of the rails or may be supported on a carriage, with power to traverse along them, as may be most convenient.

The apparatus which is employed for discharging the grain or material from the endless band is shown on a larger scale in end view at Figure 3 and in front view at Figure 4. It consists of a framing, $f$, supported by wheels $f'$ above and below the rails $a$. This framing carries in suitable bearings a rocking frame, $g$, through which the spindle $g^1$ passes, and the frame and spindle are fixed together. $h$ is a roller capable of revolving freely on the spindle $g^1$, and it stands immediately over the band $c$, which it is desired to discharge. $g^2$ is another spindle. It is carried by the arms of the rocking-frame, and upon it the drum $i$ is able to revolve freely. This drum is immediately below the band $c$, and when the discharging apparatus is not at work it stands directly under the drum $h$, and then the band $c$ passes between the two drums without being deflected. The spindle $g^1$ is squared at the end to receive a lever-handle, by which the rocking-frame $g$ can be tilted into position in which it is shown in the drawing, so as to deflect the band, and then the grain, in place of descending with the band after passing over the drum $i$, leaves it in consequence of the speed at which it is travelling, and passes into the inclined trough or chute $k$, which conducts it away to one side of the band. The rocking-frame $g$ is locked in any desired position by the pawl $g^3$ dropping into the teeth of the stop-wheel $g^4$ on the spindle $g^1$. $l$ is a chute or vessel in which the dust is collected, and is removed from time to time. The discharging apparatus may, if desired, deliver the material to a second endless band, like the first, but running at an angle to it. Such a band is shown at $m\ m$, fig. 1. It is mounted in the same way as the band $c$, except that its driving-drum receives motion when it is required from the under part of the band $c$. For this purpose the drum $n$ is mounted on a pair of the standards $b$ between the upper and under parts of the band $c$; and beneath the under part of the band is another roller, $o$, carried by a rocking-frame on the same standards $b$. This roller $o$, by means of a lever-handle, can be placed in such a position as to deflect the lower part of the band $c$ upwards, and by a ratchet and pawl the roller $o$ can there be locked. When the band $c$ is thus deflected it presses strongly on the surface of the drum $n$, and so causes it to rotate, and a bevelled pinion on its axis then drives another pinion on the terminal drum of the band $m$.

If it be desired to distribute the grain or material on a floor below that on which the endless bands are mounted, and in so doing to "condition" the grain or material, the discharging apparatus is brought into position to deliver the grain from the band $c$ into the hopper $p$, fig. 1, from which it flows down a pipe or chute $q$ to the distributer, which is shown in figs. 1 and 2, and also on a larger scale and more in detail at Figure 5. It consists of an upright axis, $r$, with the cone $s$ upon it at some distance above the floor. Immediately above the cone, and concentric with it, is the mouth of the chute $q$, so that the material is delivered directly on to the top of the cone. $s\ s'$ are radial blades fixed on the cone; they strike the grain or material as it falls and distribute it in a circle around the apparatus.

The axis $r$ is driven by a belt passing round an upright pulley upon it to a pulley, $t$, on the axis of which is a drum, $u$, and this drum receives its motion in the same way as the drum which drives the band $m$.

Having thus described the nature of my said invention and the manner of performing the same, I would have it understood that I do not confine myself to the exact details described.

But what I claim is the arranging machinery for conveying and treating corn, grain, or other articles in bulk substantially as hereinbefore described, and especially with a rapidly travelling band, on to which the grain is delivered down an incline or chute, in such manner that the material, when it comes upon the band, may be travelling approximately in the same direction and at the same speed as the band.

I also claim the bending up the band into a tray-like form at the point where the grain or material is fed on to it, substantially as herein described.

I also claim the arranging the said machinery in such manner that the carrying-band may be deflected at any point where it is desired to remove the grain or material from it, in such manner as to cause the grain or material to leave it and shoot forward into a guide-trough or chute, by which it is led away, substantially as herein described.

I also claim the cleansing of corn, grain, or other articles, by throwing it off at such a velocity from the band that the lighter particles and dust are, by the resistance of the air, separated from the bulk, substantially as herein described.

I also claim the arranging the said machinery in such manner that by deflecting the carrying-band it may be caused, where desired, to give motion to a transverse band, or to distributing and conditioning apparatus, substantially as herein described.

I also claim the distributing and conditioning corn, grain, or other article, by causing it to descend on to a cone or instrument with radial arms, rotating on a vertical axis, substantially as herein described.

<div style="text-align: right;">P. G. B. WESTMACOTT.</div>

Witnesses:
    Thos. Brown,
    John Dean, } *No. 17 Gracechurch Street, London.*